Aug. 16, 1960
W. D. KEITH
2,949,299
SAFETY CARS FOR AMUSEMENT RIDES
Filed May 26, 1958
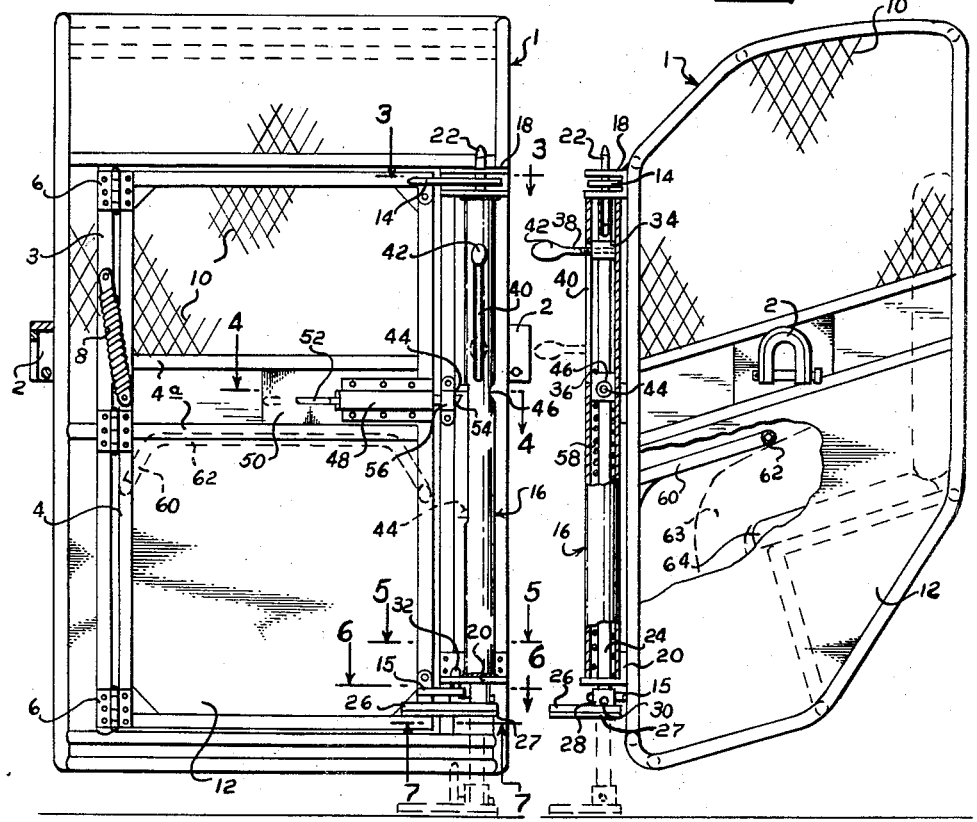
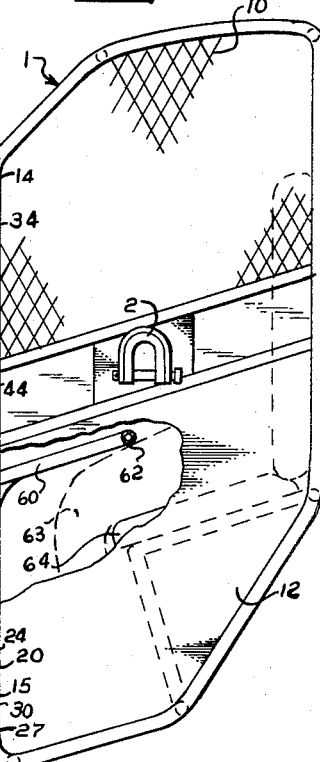
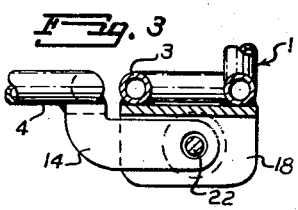
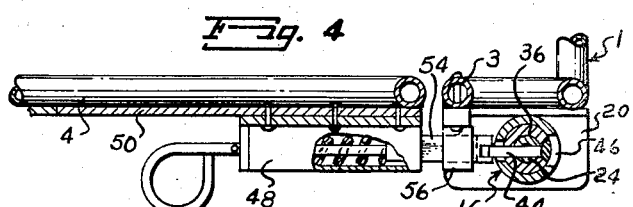
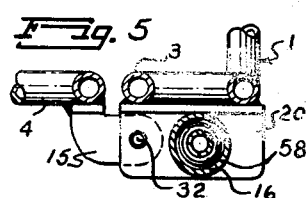
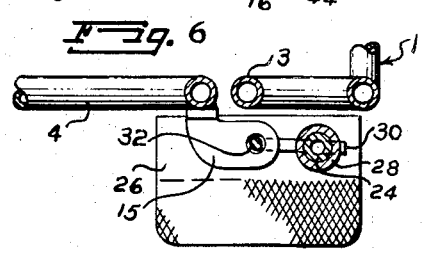
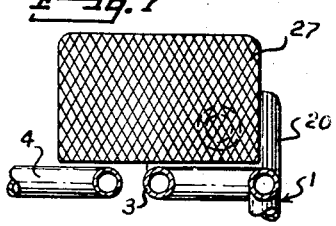
Wayland D. Keith
INVENTOR.

United States Patent Office 2,949,299
Patented Aug. 16, 1960

2,949,299

SAFETY CARS FOR AMUSEMENT RIDES

Wayland D. Keith, P.O. Box 2446, Wichita Falls, Tex.

Filed May 26, 1958, Ser. No. 737,955

7 Claims. (Cl. 272—49)

This invention relates to safety cars for amusement rides, and more particularly to safety doors for such cars, with the fastening mechanism therefor, whereby the passenger may be placed in the car and the door thereof securely bolted in such manner that the passenger will not be able to unfasten the door from the inside, and such fastenings will prevent the door from accidentally coming open, even though the car is rotating about a horizontal axis, and even though the safety belt or other passenger securing means should fail.

The present device is safe for use with such amusement rides as the aerial rides which rotate about a horizontal axis, which includes the Ferris wheel, the Orbit, and the like.

Various safety doors for cars of amusement rides have been proposed heretofore, however, these, for the most part, required the loading of the passengers into the cars from a side in alignment with the axis of rotation, which limits the use of the cars to such devices as use a support on one side only thereof.

The present device is so constructed as to enable the cars equipped therewith, to be interchanged with the cars as presently used on Ferris wheels, without it being necessary to make any structural changes in the Ferris wheel. The door and the fastenings therefor, as shown herein, provides four separate and independent locks or fastenings, which fastening arrangement provides for the interlocking of two separate systems of safety fastenings, whereby it is necessary for one set of latches to be released before the other can be operated to open the door.

An object of this invention is to provide a door for the car of an amusement ride and the fastening means therefor, whereby the door may be opened only from the outside, once it is latched with both latch systems.

Another object of the invention is to provide a locking arrangement for the door of an amusement ride car, which door may be opened by an operator using one hand and one foot, or both hands.

Another object of the invention is to provide a fastening means for the door of an amusement ride car, whereby the door may be locked with one of the slide bolts serving as an interlock to prevent the movement of the other system of slide bolts.

A still further object of the invention is to provide a device whereby a manually operated lever is provided for releasing certain of said slide bolts and for the additional purpose of stabilizing a car while the passengers are being loaded or unloaded therefrom.

Yet another object of the invention is to provide a safety door, which, when closed, provides a passenger engaging means to maintain the passenger in seated position while he occupies the car.

With these objects in mind and others which will become manifest as the description proceeds, reference is to be had to the accompanying drawings in which like reference characters designate like parts in the several views thereof, in which:

Fig. 1 is a front elevational view of an amusement ride car, shown apart from the ride, and showing the car in position for loading, with the car stabilizing element being shown in dashed outline in stabilizing position;

Fig. 2 is a side elevational view of the amusement ride car, as shown in Fig. 1, but showing the door thereof in closed and latched position, in full outline, and showing the latches in disengaged position, together with the car stabilizer member in dashed outline;

Fig. 3 is a sectional view taken on the line 3—3 of Fig. 1, looking in the direction indicated by the arrows;

Fig. 4 is a sectional view taken on the line 4—4 of Fig. 1, looking in the direction indicated by the arrows;

Fig. 5 is a sectional view taken on the line 5—5 of Fig. 1, looking in the direction indicated by the arrows;

Fig. 6 is a sectional view taken on the line 6—6 of Fig. 1, looking in the direction indicated by the arrows;

Fig. 7 is a sectional view taken on the line 7—7 of Fig. 1, looking in the direction indicated by the arrows.

With more detailed reference to the drawing, the numeral 1 designates generally an amusement ride car, which car is mounted on bearings 2 to pivot about a horizontal axis. The bearings 2 are of the general character used to mount the cars of Ferris wheels and the like. Each of the bearings has an open lower end and they are formed in the shape of an inverted U, so as to engage an outstanding knob or ball to pivot the car on a horizontal axis, so that the passengers of the car 1 will normally ride with heads in an upright position.

The car 1 is preferably made of structural elements, such as tubular steel, aluminium or the like, and has a door facing 3 which surrounds the front of the car to form an entrance opening for loading passengers into the car, as well as providing an exit therefrom. The door 4 is hingeably mounted within the opening formed by facing 3, by hinges 6. The hinges are secured to one side of the door and to the facing, by bolts, welding or the like.

The door frame may also be made of structural elements, such as tubular steel, aluminium or the like. A torsion spring 8 is secured to the door facing 3 and to the frame of the door 4, so as to urge the door into closed position. It is preferable to have at least the top portion of the frame covered with mesh material, such as expanded metal, as indicated at 10, which will give the passengers an open view from inside the car. The lower portion of the car may be covered by sheeting, as indicated at 12, or this portion too may be covered with expanded metal or other mesh material, as desired. A construction of this character provides a car that is light in weight, and which may be readily attached to the ride, or removed therefrom, which is compact for moving from place to place.

The side of the door opposite the hinges has two outstanding lugs 14 and 15, which are preferably made of angle construction, an angle portion of each being bolted or welded to the facing of the door 4, as will best be seen in Figs. 1, 3, 5 and 6.

The door facing opposite the hinges 6 has an elongated tubular member thereon, designated generally at 16, which tubular member has a channel member 18 secured to the upper end thereof and to an angle member 20 which is secured thereto at the lower end. It is preferable to secure the member 18 to the upper end of the tubular member 16 by brazing or welding with a low melting point metal, so the upper end may be readily removed, if it is desired to disassemble and reassemble the unit.

Th out-turned flanges of channel member 18 and angle member 20 are perforated to receive axial slide bolt 22 and stem 24, which stem 24 is mounted axially within tubular member 16. The slide bolt 22 is pointed at its upper end and is secured within the upper end of stem 24, as by welding or the like. The hole formed within the lug 14 is adapted to register with the holes formed through the flanges of channel member 18, when the door is closed, so when the lug 14 is interfitted between the flanges of the channel member 18 and the axial slide bolt 22 is passed through the holes in the flanges of channel 18 and through the hole in the lug 14, when it is positioned therebetween, the upper end of the door is secured against movement until the slide bolt 22 is moved downward and out of engagement with the flanges of the channel member 18.

The lower end of the stem 24 has a pedal 26 secured thereon to which an upstanding socket 28 is secured. The pedal 26 preferably has a rubber-like facing 27 secured to the lower end thereof, to engage the ground or floor to prevent the slipping of the pedal 26, with respect thereto. The socket 28 is transversely apertured to receive a pin 30 therethrough and through a transverse hole in the lower end of stem 24. The pin 30 extends outward and is upturned and pointed to form a portion 32 which forms a slide bolt, which slide bolt works in unison with the slide bolt 22. When the stem 24 is depressed, it moves from the position as indicated in full outline in Fig. 1 to that indicated in dashed outline therein, and when the stem 24 is in the position, as shown in full outline in Fig. 1, the upturned portion of pin 32 passes through an aperture formed in lug 15 and through an aperture formed in the out-turned flange of angle member 20, so as to lock the lug 15 in secure relation between pin 30 and the out-turned flange of angle 20. The stem 24 has guide rings 34 and 36 thereon along the length thereof. The guide ring 34 is in close fitting relation with the stem 24 and in sliding relation within the hollow portion of tubular member 16. The guide ring 34 and stem 24 have transversely aligned apertures formed therein to receive a pin 38, which may be screw threaded thereinto and which pin may extend outward through a slot 40 in tubular member 16. The pin 38 has a handle 42 on the outer end thereof so as to move stem 24 downward within tubular member 16.

The guide ring 36 is positioned at a lower elevation than the guide ring 34. The guide ring 36 and stem 24 are transversely apertured, so when said respective apertures are in register, a pin 44 may be passed therethrough to extend outward through a slot which is formed in a side of tubular member 16. In as much as the safety of the passengers of the car 1 depends upon the pin 44 being maintained in place, it is preferable to braze this pin to stem 24 to prevent the pin from turning and to prevent the pin coming out under normal usage. However, upon heating the pin to a sufficient temperature to melt the bond of the brazing or other low fusion metal, the pin may be removed from the hole 46, which is provided in the opposite side of the tubular member 16 from the outwardly projecting pin 44. The pin 44 has a bevel on the upper side thereof, which slopes outwardly and downwardly to form a beveled end. The spring pressed barrel bolt 48 is secured to a plate 50 which is secured to door 4. The bolt 48 has an out-turned handle or loop 52 thereon to enable the plunger 54 of the barrel bolt 48 to be manually operated, when desired. The plunger 54 has the outer end thereof beveled to complementarily engage the bevel on the pin 44 as the stem 24 moves upward so as to automatically depress the plunger 54, however, when the pin 44 passes thereabove, the compressed spring within barrel bolt 48 will move plunger 54 outward into the position as shown in full outline in Fig. 1, thereby maintaining axial slide bolt 22 in interengaged relation with lug 14 and the out-turned flanges of the channel member 18, and also to maintain the upturned portion 32 of pin 30 in engaged relation with lug 15 and the out-turned flange portion of angle 20.

The pedal 26 is of such length as to extend outward from stem 24 in over-lapping relation with respect to door 4, therefore, when in position as shown in full outline in Figs. 1, 2 and 7, the door cannot be opened.

A latch keeper 56 is secured to the door facing 3 adjacent the tubular member 6, in a position to receive the plunger 54 therethrough, which will securely lock the middle of the door 4 with respect to the door facing 3. The barrel bolt 48 also serves to prevent the movement of the stem 24 downward, once the pin 44 has moved upward above spring pressed plunger 54.

A spring 58 surrounds the stem 24 and is encased within tubular member 16 in such manner as to have the upper end thereof in abutting relation with the lower face of guide ring 36 and the upper face of out-turned flange of angle 20, so upon downward movement of pedal 26, the spring will be compressed. Upon release of pressure from pedal 26, the spring 58 will return stem 24 to the position as shown in Figs. 1 and 2. The spring 58 is of sufficient tension to move the bevel face of pin 44 upward against the bevel face of plunger 54 of barrel bolt 48 at sufficient pressure to depress the spring in barrel bolt 48 and plunger 54, to permit the pin 44 to move upward above plunger 54, whereupon, the spring in barrel bolt 48 will move the plunger beneath pin 44 so as to lock pin 44 and stem 24 against downward movement.

The door 4 has a U-shaped tubular member abridging the door in horizontal relation and extending inwardly. The U-shaped member comprises an inwardly extending arm 60 on each end, which are welded, or otherwise secured, to the frame of the door 4. The arms 60 have a bar 62 abridging therebetween, which bar is of such height as to extend inwardly above the legs 63 of the passenger of the car, thereby preventing the passenger from raising out of the seat 64, while the door 4 is closed.

*Operation*

The present car is so designed that an operator or individual loading the passengers, can readily open the door by moving loop portion 52 of the plunger 54 against tension of the spring in barrel bolt 48 until the plunger 54 disengages the loop keeper 56 secured to the door facing 3, whereupon, the foot may be placed on the upper side of pedal 26, which pedal is preferably knurled, or otherwise roughened, whereby the pedal is moved from the position as shown in full outline in Figs. 1 and 2 to that shown in dashed outline therein. With the pedal moved to this position, the rubber-like facing 27 will engage the floor beneath the car and stabilize the car against movement, while simultaneously withdrawing slide bolts 22 and 32 from the respective apertures within the respective lugs 14 and 15, and also moving the pedal 26 out of abridging relation with respect to door 4, which will permit the door to be swung open on hinges 6 against tortional action of torsion spring 8, one end of which spring is secured to door facing 3 and the other end of which is secured to the frame of the door 4.

When the passengers have been loaded or unloaded, as the case may be, the door is permitted to swing into closed position. However, the plunger 54 of the barrel bolt 48 will be drawn inward until the door can be closed, so that plunger 54 will be in register with keeper 56, whereupon, the plunger can be released, which will engage the keeper and form a bolt action, the bolt of which cannot be operated by the passenger inside the car, as the plate 50 prevents access to the looped end portion 52 of the plunger.

When the loading of the car with passengers has been completed, the foot is removed from pedal 26, whereupon, sping 58 will move stem 24 upward from the position as shown in dashed outline in Figs. 1 and 2 to that shown in full outline therein. Whereupon, the slide bolts 22 and 32 will engage the respective openings in the respective lugs 14 and 15, as will best be seen in Figs. 3 and 5, to hold the lugs in secure relation with respect to the apertured channel member 18 and apertured angle member 20, respectively. However, upon upward movement of the stem 24, the pin 44 will move into engagement with the angle face of plunger 54, which will cause the plunger to move inward to permit the pin 44 to pass thereabove, whereupon, when the pin is moved into the position as shown in Figs. 1 and 4, the spring of barrel bolt 48 will cause the plunger to move outward, which will lock the stem 24 against the accidental or unauthorized downward movement.

A handle 42 extends outward from stem 24, near the upper end thereof, which may be manually operated, in lieu of foot operation thereof, as desired.

It will be appreciated that the present arrangement provides a method of maintaining an amusement car door closed, until such time as it is opened by an attendant. It is, at no time, possible for a passenger to either accidentally or willfully open the door from the inside, therefore, should a passenger become frightened and panic, it is not possible for the door to be opened until the car is brought to a safe, upright, stabilized position for the door to be opened, and then only by an attendant.

While the invention has been illustrated and described in some detail in one embodiment thereof, it is to be understood that changes may be made in the minor details of construction and adaptations made to different installations without departing from the spirit of the invention or the scope of the appended claims.

Having thus clearly shown and described the invention, what is claimed as new and desired to be secured by Letters Patent is:

1. A safety car for an amusement ride comprising; a car frame, a covering for said car frame, a car support mounted on a side of said car for pivotally supporting said car for movement about an axis, a door hingeably mounted on a side of said car frame and covering the greater portion of said side when said door is in closed position, said door having apertured lugs secured thereto, one near each end thereof on the side opposite the hinge mounting of said door, stem support means mounted on said frame opposite the hinge mounting of said door, an elongated, upright stem slidably mounted within said stem support means, a spring connected in resilient relation between said stem support means and said slidable stem for urging said stem in one direction, outwardly projecting pins secured to said stem, one near each end thereof and being movable therewith, which pins are adapted to register with the respective apertures in the respective lugs when said stem is in one position and to disengage said lugs when said stem is in another position, and means attached to said stem to enable manual movement of said stem against the resilient action of said spring.

2. A safety car for an amusement ride as defined in claim 1; wherein a spring pressed barrel bolt is mounted on said door intermediate the ends thereof on the side opposite the hinge mounting of said door, a keeper, having an opening formed therethrough, mounted on said frame in complementary relation to said barrel bolt, said bolt extending outward through said keeper in over-lapping relation to the frame of said car, the lower face of said bolt being beveled upwardly and outwardly with respect to said door, said slidable stem having an outwardly projecting pin thereon which is adapted to lie within the plane of the bevel portion of said bolt, which outwardly projecting pin is movable from a position above said bolt to a position below said bolt, said outwardly projecting pin being adapted to complementarily engage the bevel portion of said bolt upon upward movement of said outwardly projecting pin, and means on said bolt to withdraw said bolt out of the line of travel of said outwardly projecting pin and out of engagement with said keeper.

3. A safety car for an amusement ride comprising; a car frame, a covering for said car frame, a car support mounted on a side of said car for pivotally supporting said car for movement about an axis, a door hingeably mounted on a side of said car frame and covering the greater portion of said side when said door is in closed position, said door having outwardly extending, apertured lugs thereon, one near each end thereof, an elongated, upright tubular member secured to said frame opposite the side of said door on which said hinges are mounted, a slidable stem mounted within said tubular member, a spring positioned within said tubular member and being connected in resilient relation between said tubular member and said slidable stem for urging said stem in one direction, outwardly projecting pins secured to said stem, one near each end thereof and being movable therewith, which pins are adapted to fit within the respective apertures in said respective lugs when said stem is in one position, and to disengage said lugs when said stem is in another position, and means attached to said stem to enable manual movement of said stem against the resilient action of said spring.

4. A safety car for an amusement ride comprising; a car frame, a covering for said car frame, a car support mounted on a side of said car for pivotally supporting said car for movement about an axis, a door hingeably mounted on a side of said car frame and covering the greater portion of said side when in closed position, said door having outwardly extending, apertured lugs thereon, one near each end thereof, a spring pressed plunger mounted on the side of said door opposite said hinges, a latch keeper mounted on said frame adjacent to and in aligned relation with said plunger, an elongated, upright tubular member secured to said frame opposite the side of said door on which said hinges are mounted, a slidable stem mounted within said tubular member, a spring positioned within said tubular member and being connected in resilient relation between said tubular member and said slidable stem for urging said stem in one direction, outwardly projecting pins secured to said stem, one near each end thereof, and being movable therewith, which pins are adapted to fit within said respective apertures in said respective lugs when said stem is in one position and to disengage said lugs when said stem is in another position, and means attached to said stem to enable manual movement of said stem against the resilient action of said spring.

5. A safety car for an amusement ride as defined in claim 4, wherein said tubular member has a slot formed therein for a portion of the length thereof, a transverse pin secured to said stem and extending outwardly through said slot, said transverse pin having the outwardly extending end portion thereof lying within a plane occupied by an end portion of said plunger when said door is in closed position, said transverse pin and said plunger having complementary faces on the respective ends thereof to permit movement of said transverse pin thereby when said stem is moved in one direction and to restrain movement of said stem and said pin thereby when moved in the opposite direction.

6. A safety car for an amusement ride as defined in claim 3 wherein, the frame of said car has a member mounted thereon at the upper end of said tubular member, which member has an out-turned, apertured flange, the aperture of which flange will register with the aperture in said upper lug when said door is in closed position, and wherein said tubular member has a member secured to the opposite end thereof, which last mentioned member has an out-turned, apertured flange, the aperture of which is adapted to register with an aperture formed in a lug mounted on said door, when said door is in closed position.

7. A safety car, having a seat, for an amusement ride comprising, a car frame, a covering for said car frame, a car support mounted on the side of said car for pivotally supporting said car for movement about an axis, a door frame hingeably mounted on a side of said car frame and covering the greater portion of said side when in closed position, an arm mounted on each side of said door frame and extending inwardly over said seat, and a longitudinal member extending between and being connected to the inner ends of said arms.

References Cited in the file of this patent

UNITED STATES PATENTS 2,592,879  Eyerly ---------------- Apr. 15, 1952